United States Patent Office.

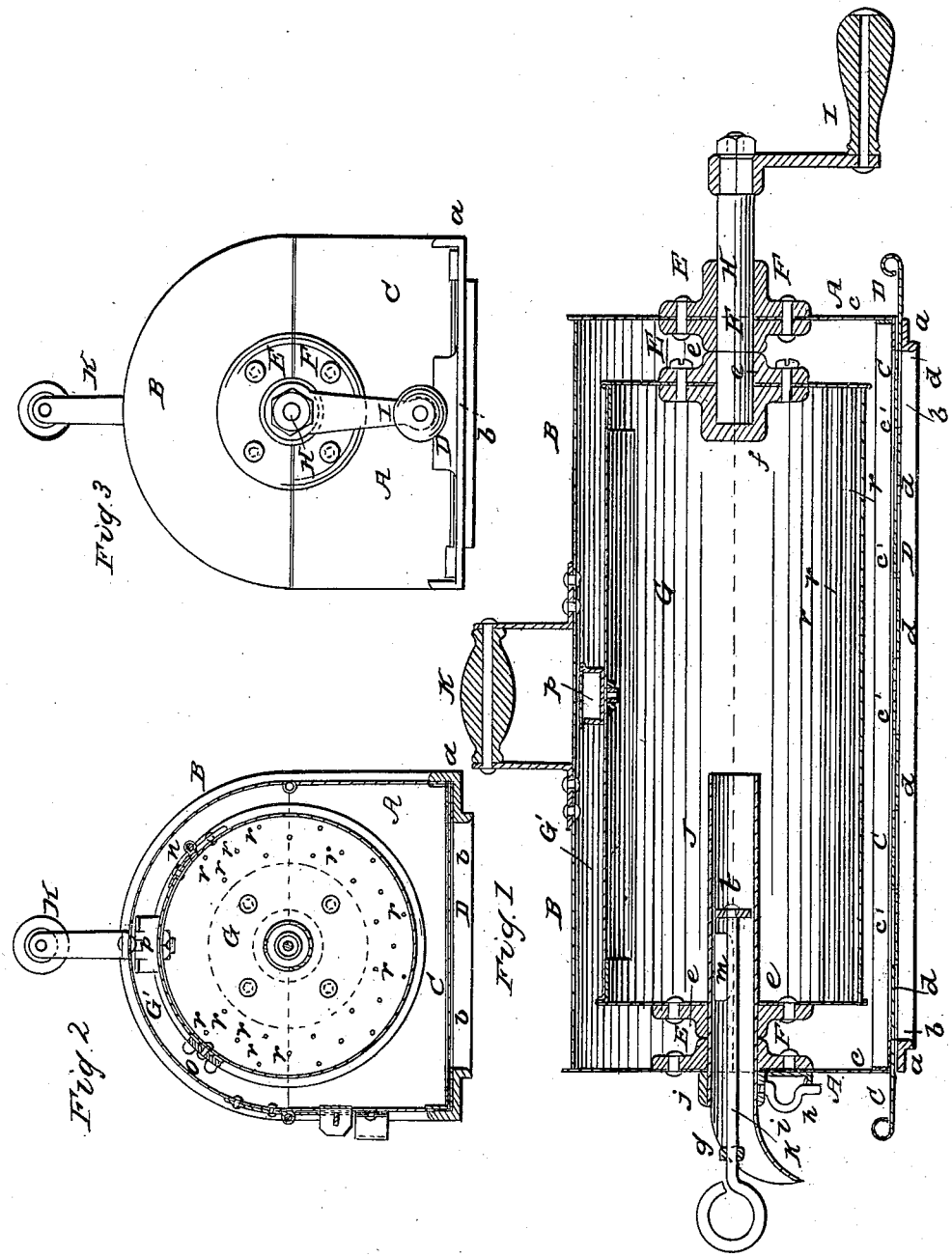

JAMES B. PEAKE AND JAMES A. LUSBY, OF WASHINGTON, DISTRICT OF COLUMBIA.

Letters Patent No. 92,090, dated June 29, 1869; antedated June 19, 1869.

---

COFFEE-ROASTER.

---

The Schedule referred to in these Letters Patent and making part of the same.

---

*To all whom it may concern:*

Be it known that we, JAMES B. PEAKE and JAMES A. LUSBY, both of the city of Washington, in the District of Columbia, have invented a new and useful Improvement in Coffee-Roasters; and we do hereby declare the following to be a full and correct description of the same, sufficient to enable others skilled in the art to which our invention appertains, to fully understand and make the same, reference being had to the accompanying drawings, which make part of this specification, and in which—

Figure 1, sheet 1, is a longitudinal vertical section of our improved roasting-machine;

Figure 2, sheet 2, is a vertical cross-section; and

Figure 3, an end view of the same.

Like letters of reference indicate like parts in the several figures.

The nature of our invention consists—

First, in a double damper at the bottom of the roaster, arranged in such a manner as to either entirely shut off the fire and heat, or graduate its passage through the dampers, or leave the opening which the dampers cover entirely free.

Second, in the arrangement within the roasting and revolving cylinder, of three separate rows of wires, for the purpose of stirring and shaking the coffee-beans while roasting.

Third, in the combination, with the revolving cylinder, of an oiler, by means of which the coffee can be greased.

Fourth, in the application of a device for trying the coffee while roasting, without stopping the motion of the revolving cylinder, or otherwise interfering with the operation of roasting.

A, in the drawings, may represent the outer casing, of any suitable material, provided with a semicircular lid, B.

This casing is open at the bottom, and is provided with a flange, $a$, ending at the under side in a rim, $b$, which may be of the shape of common boiler-plate holes, so as to set into one of those holes on the top of the stove.

Between the end pieces $c$, of the casing A, and the flange $a$, there is an open space, sufficiently large to allow two sliding dampers, C D, to move easily forward and back.

These dampers, C D, consist of plates of any suitable materials, provided at regular intervals with square slots, $c'$ $d'$, the slots in both dampers being of equal size, so that when in position, as shown in fig. 1, the bottom of casing A is entirely closed.

E E, F F, are halves of circular bearings, attached respectively to the inside of the lid B and casing A, similar halves being attached to the outside, at one end.

These halves form the bearings for the shafts which support the revolving cylinder G, in which the coffee is roasted.

This cylinder is provided, at its ends, on the outside, with bearings, $e$, and at one end, on the inside, with the round socket $f$, having a square interior surface, into which fits the square end of the shaft H, which carries, at its outer end, the crank-handle I.

The other end of the cylinder G is supported by the tube J, having a collar, $j$, formed on it, and the outer end of which is formed into a downward lip.

The collar $j$ is provided with a downwardly-projecting rod, $i$, which may be bent so as to form a handle, and which passes through a small plate, $h$, suitably attached to the casing A, and may be locked by a key, or any other suitable device.

$g$ is a small bearing, attached to the mouth of tube, J, for the rod K, which moves the small piston $l$, in the tube, which, at a short distance from its inner end, is provided with one or more square slots, $m$.

The cylinder G has a lid, G', hinged at $n$, and when closed, secured by buttons, $o$.

About the centre of the lid G', and passing through it, is a small oil-cup, $p$, which may be filled with sweet-oil, or any other fatty substance.

Secured in the ends of cylinder G, and running longitudinally from end to end, are wires, $r$, arranged in three rows, as shown in fig. 2.

K is a handle, suitably attached to the casing A.

The operation of our device is as follows:

The casing A is placed over a boiler-plate hole, and the cylinder G placed in its bearings, as shown in fig. 1, the tube J being held firmly by means of rod $i$.

The cylinder is then filled with coffee, and its lid, G', closed and secured by buttons, $o$.

The lid B, of the casing, is then also closed, and the cylinder revolved by means of crank-handle I.

As the cylinder revolves, the coffee-beans are constantly stirred and shaken by the wires $r$, against which they fall, the wires being placed so as to allow the beans to fall between the two inner rows of them, and be thrown by them around, the outer row being too near the casing to allow any beans to pass between it and the wires. And by means of this shaking, an equal burning of the coffee is attained, as each of the beans comes thereby in equal contact with the heat. Many persons prefer to impregnate the coffee, while roasting, with fatty or aromatic substance, as sweet-oil, butter, lard, &c.

For this purpose the cup $p$ is filled with any desired fatty or aromatic substance, which is, as the cylinder revolves, distributed from the same among the beans.

As the cylinder G revolves around the tube J, some of the beans will fall into the latter through slot or slots $m$, and by drawing out the rod K, these beans are drawn towards the mouth of the tube, and thus at any time can the condition of the coffee be ascertained, and not only from one part of the cylinder, but from all parts, for the wires $r$ are so arranged that the beans strike them at angles, so as to be scattered all over the cylinder, and thus beans from every part of the cylinder will fall into tube J.

If the fire is not too hot, and at the beginning of burning coffee, both dampers, C D, may be either entirely withdrawn, or drawn out so far as to be still held by the flange $a$.

As the operation is progressing, and it is desired to exercise more care, so as to obtain the proper amount of roasting, one or the other of the dampers may be pushed in, or both of them, in which latter case the slots $c'$ $d$ ought to cover each other, and thus less heat will reach the cylinders; and this influx of heat may be still more regulated by further moving either one or the other damper, and thus more or less closing the slots $c'$ $d$, until the heat may be entirely shut off, by covering one damper by the other, as shown in fig. 1.

The roasted coffee may be removed from cylinder G, and the latter filled with another lot of beans to be roasted, and replaced without taking the casing A from the stove.

The three rows of wires perform peculiar functions, which cannot be performed by either flanges, or by a single row of wires alone, both of which latter we are well aware are old, and which we desire to distinctly disclaim. Our two inner rows of wires are set in such a manner as to allow the beans to pass between them, by means of which motion they are scattered and turned so as to be submitted to heat on all sides equally, and to be well mixed, while the outer row is so arranged, in relation to the inner ones, that the beans passing between the latter cannot touch the cylinder, but must strike the outer row, and are thus thrown back into the cylinder.

Having thus described our invention,

What we claim as new, and desire to secure by Letters Patent, is—

1. A coffee-roaster, constructed with a flange, $a$, and a double damper, C D, substantially as and for the purpose described.

2. The arrangement, in a coffee-roaster having a revolving cylinder, of three or more rows of wires, set parallel to its periphery, substantially as and for the purpose set forth.

3. The combination, with a revolving coffee-roasting cylinder, of an oil-cup, substantially as and for the purposes described.

4. In a coffee-roaster, the trying-device, consisting of slotted tube J, rod K, and piston $l$, substantially as and for the purposes set forth.

JAMES B. PEAKE,
JAMES A. LUSBY.

Witnesses:
ALEXR. A. C. KLAUCKE,
SAMUEL SMITH.